(Specimens.)
W. LEIGHTON, Jr., & W. F. RUSSELL.
MANUFACTURE OF OPALESCENT GLASSWARE.
No. 343,133. Patented June 1, 1886.
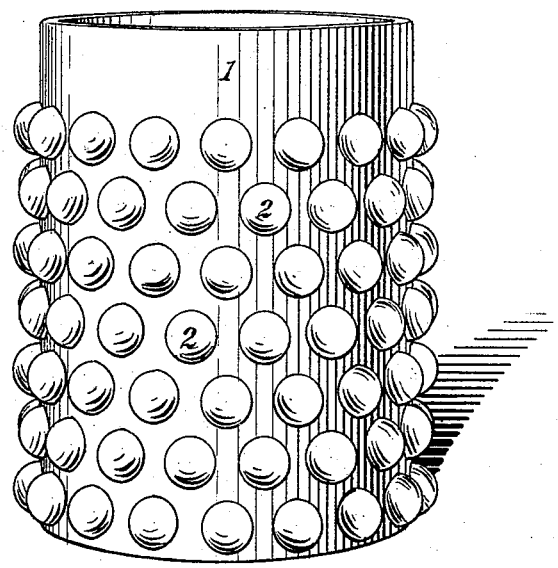
WITNESSES:
INVENTORS.
Att'y.

UNITED STATES PATENT OFFICE.

WILLIAM LEIGHTON, JR., AND WILLIAM F. RUSSELL, OF WHEELING, WEST VIRGINIA, ASSIGNORS TO HOBBS, BROCKUNIER & CO., OF SAME PLACE.

MANUFACTURE OF OPALESCENT GLASSWARE.

SPECIFICATION forming part of Letters Patent No. 343,133, dated June 1, 1886.

Application filed March 11, 1886. Serial No. 194,764. (Specimens.)

*To all whom it may concern:*

Be it known that we, WILLIAM LEIGHTON, Jr., and WILLIAM F. RUSSELL, residing at Wheeling, in the county of Ohio and State of West Virginia, citizens of the United States, have invented or discovered certain new and useful Improvements in the Manufacture of Opalescent Glassware, of which improvements the following is a specification.

In the accompanying drawing, which makes part of this specification, the figure is a view in side elevation of a tumbler manufactured in accordance with our improved method.

The invention herein relates to certain improvements in the manufacture of opalescent glassware. This opalescent effect is produced by whitening or rendering semi-opaque certain parts or points of a body otherwise transparent, and the method heretofore employed therefor consisted in mixing with the glass suitable ingredients whereby the glass will be whitened or rendered semi-opaque by cooling and reheating, blowing a ball of glass of such composition in a mold having numerous recesses or indentations in its molding-face, such recesses or indentations being of such size and depth as to rapidly cool the portions of glass forced therein. The ball of glass thus formed with numerous projecting bosses or nodules on its surface is removed from the mold and allowed to cool, and is then reheated. As the projections or nodules have been cooled to a greater degree than the body of the glass, by reason of the comparatively greater surface exposed to the cooling action of the mold and exposure to air, the subsequent reheating will render the nodules or projections white or semi-opaque without materially affecting the body of the glass. After the reheating the ball of glass is blown into any desired shape.

The above-described process of manufacturing opalescent glassware is not only slow, but costly, as it is done by skilled workmen.

The object of the invention herein is to so change the manufacture of such glassware as to permit of the production of more perfect articles in a more expeditious manner and avoid the employment of skilled workmen; and to these ends the invention consists in the method substantially as hereinafter described and claimed.

In carrying out our improved process a mold is formed of the shape and size as near as possible of the article to be made, and provided in its molding-face with indentations or cavities for the formation of nodules or projections 2 on the surface of the article 1. These cavities or indentations are so proportioned as to size and depth as to produce a more rapid chilling or cooling of the glass forced therein than is produced on the body of the article.

Molten glass, composed as heretofore customary in the manufacture of opalescent glass, is placed in the mold and pressed to shape in the usual manner. As soon as molded, the article is removed and cooled off, preferably by placing it in a blast of air, although any other suitable means for cooling may be employed. After the article has been cooled off it is placed in a suitable furnace and reheated to a cherry-red heat, (more or less,) to bring out the opalescent effects on the nodules or projections, and then annealed in the usual manner. If the article to be made is of such a shape as to render it incapable of being molded to final shape, the necessary hand manipulation is effected after the reheating and before annealing.

The mold now used in the manufacture of opalescent glassware is considerably smaller than the article to be produced, its purpose being the formation of chilled nodules on the surface of the ball, which is subsequently blown to final shape and size; but in the method herein described the formation of the nodules and the shaping of the article are effected simultaneously by pressing in the mold, thus avoiding the necessity of employing skilled labor for blowing the article to shape, and entirely omitting the second shaping operation.

We do not limit ourselves herein to any particular form or size of indentation or recess to be used, as the same may be varied to suit the fancy of the manufacturer, provided such indentations are of a size and shape to produce the necessary chilling effect.

We claim herein as our invention—

1. As an improvement in the art of manufacture of opalescent glassware, the method herein described, which consists in pressing the glass to shape in molds having suitable indentations or recesses for the formation of nodules on the surface of the article, cooling the molded article, and then reheating the same, substantially as set forth.

2. As a new article of manufacture, pressed opalescent glassware, substantially as set forth.

In testimony whereof we have hereunto set our hands.

WILLIAM LEIGHTON, Jr.
WILLIAM F. RUSSELL.

Witnesses:
ANNIE M. GAYHART,
JOS. H. DE VILLE.